United States Patent [19]

Mallien, II

[11] 4,220,820
[45] * Sep. 2, 1980

[54] CONTROL CIRCUITRY FOR A RADIO TELEPHONE

[75] Inventor: Thomas O. Mallien, II, Palatine, Ill.

[73] Assignee: Motorola, Inc., Schaumburg, Ill.

[ * ] Notice: The portion of the term of this patent subsequent to Oct. 24, 1995, has been disclaimed.

[21] Appl. No.: 948,356

[22] Filed: Oct. 2, 1978

Related U.S. Application Data

[63] Continuation of Ser. No. 783,888, Apr. 1, 1977, Pat. No. 4,122,304.

[51] Int. Cl.² .................... H04M 11/00; H04M 1/27
[52] U.S. Cl. ................ 179/2 EB; 179/90 B; 364/900
[58] Field of Search ............... 179/2 E, 2 EA, 2 EB, 179/90 K, 90 B; 325/53, 55, 64, 15, 16, 25; 364/200 MS File, 900 MS File

[56] References Cited

U.S. PATENT DOCUMENTS

| 3,458,664 | 7/1969 | Adlhoch et al. | 325/55 |
|---|---|---|---|
| 3,760,121 | 9/1973 | Nissim | 179/90 K |
| 3,906,166 | 9/1975 | Cooper et al. | 325/55 |
| 3,912,875 | 10/1975 | Katz | 179/2 EB |
| 4,012,601 | 3/1977 | Kehren | 179/90 K |
| 4,028,500 | 6/1977 | McClure et al. | 179/90 K |
| 4,032,844 | 6/1977 | Imazeki | 325/15 |
| 4,122,304 | 10/1978 | Mallien | 179/90 B |

OTHER PUBLICATIONS

"Microprocessors: Technology, Architecture, and Applications", Daniel R. McGlynn, (J. Wiley & Sons, New York), 1976, pp. 182-183.

Primary Examiner—James W. Moffitt
Assistant Examiner—Joseph A. Popek
Attorney, Agent, or Firm—Rolland R. Hackbart; James W. Gillman

[57] ABSTRACT

A control circuitry for a radio telephone having a transmitter, a receiver, a cradle and a handset. The handset includes a first computer having a stored program control therein, a first memory, a telephone number display and a pushbutton pad. The cradle includes a second computer having a stored program control therein, a second memory, a plurality of control switches and radio telephone status indicators. A dialed number is entered into the handset memory from the pushbutton pad, under control of the handset computer. Then during a telephone call, the entered number is transferred from the handset computer to the cradle computer and transmitted by the cradle computer. Frequently called numbers can be stored in the handset memory or the cradle memory and later, can be readily recalled and transmitted. The last dialed number can be automatically retransmitted in a subsequent call.

30 Claims, 14 Drawing Figures

| HANDSET COMPUTER-C BUS CONTROL=1 | | | | |
|---|---|---|---|---|
| CHARACTERS | C BUS 3 | C BUS 2 | C BUS 1 | C BUS 0 |
| (IDLE STATE) | 0 | 0 | 0 | 0 |
| DIGIT 1 | 0 | 0 | 0 | 1 |
| DIGIT 2 | 0 | 0 | 1 | 0 |
| DIGIT 3 | 0 | 0 | 1 | 1 |
| DIGIT 4 | 0 | 1 | 0 | 0 |
| DIGIT 5 | 0 | 1 | 0 | 1 |
| DIGIT 6 | 0 | 1 | 1 | 0 |
| DIGIT 7 | 0 | 1 | 1 | 1 |
| DIGIT 8 | 1 | 0 | 0 | 0 |
| DIGIT 9 | 1 | 0 | 0 | 1 |
| DIGIT 0 | 1 | 0 | 1 | 0 |
| NUMBER/PUSH-TO-TALK | 1 | 0 | 1 | 1 |
| CHANNEL | 1 | 1 | 0 | 0 |
| MEMORY | 1 | 1 | 0 | 1 |
| SEND | 1 | 1 | 1 | 0 |
| CLEAR | 1 | 1 | 1 | 1 |

Fig. 8

| CRADLE COMPUTER-C BUS CONTROL=0 | | | | |
|---|---|---|---|---|
| CONTROL CONDITIONS | C BUS 3 | C BUS 2 | C BUS 1 | C BUS 0 |
| ON HOOK | 0 | 0 | 0 | 0 |
| OFF HOOK | 0 | 1 | 0 | 0 |
| STORE | 0 | 0 | 0 | 1 |
| STANDBY | 0 | 0 | 1 | 1 |
| ACKNOWLEDGE | 0 | 1 | 1 | 0 |

Fig. 9

CONTROL CIRCUITRY FOR A RADIO TELEPHONE

This is a continuation of application Ser. No. 783,888, filed Apr. 1, 1977, now U.S. Pat. No. 4,122,304.

BACKGROUND OF THE INVENTION

1. Field of the Invention

This invention relates to control circuitry for a radio telephone, and more particularly, to stored program control for a radio telephone.

2. Description of the Prior Art

In the prior art, radio telephone control circuitry has been mechanized with discrete logic elements, resulting in a large number of circuit elements which physically occupy a large amount of space. This size restriction has dictated that the control circuitry must be located in the cradle, not in the handset. A large number of logic elements complicates the control circuitry. The highly complex control circuitry is relatively expensive to build and maintain.

The control circuitry of the prior art is inflexible and not easily changed or enhanced. In order to accommodate optional features additional control circuitry must be added.

Prior radio telephones have primarily used the rotary dial to produce the dialed digits. The rotary dial introduces dial pulse distortion due to the inherent inaccuracy of the dialing mechanism. This problem has been partially overcome by utilizing dual tone dialing circuits.

The radio channel selection has previously been accomplished by individual manually operated switches or by multiposition rotary switches. Expanded automatic and selective channel selection is presently not available.

The foregoing deficiencies reveal a long felt need for a stored program control circuitry for radio telephones that overcomes these limitations.

OBJECTS OF THE INVENTION

It is an object of the invention to provide an improved control circuitry for radio telephones that is inexpensive and compact.

It is a further object of the invention to provide a control circuitry that is flexible with regard to the features that it provides, that reconstructs and accurately forwards the dialed telephone number, and that provides expanded automatic and specific radio channel selection by means of a circuitry incorporating stored program control.

It is a still further object of the invention to provide a control circuitry that has a relatively small number of circuit components, resulting in simplified maintenance and minimized power source current drain.

SUMMARY OF THE INVENTION

The present invention provides a control circuitry for a radio telephone having a transmitter, a receiver, a cradle, and a handset which has means for dialing a telephone number consisting of a plurality of digits. The control circuitry comprises a first memory means and a first control means in the radio telephone handset and a second control means in the radio telephone cradle. The first control means stores a dialed number into the first memory means, reads out the stored dialed number from the first memory means, converts the read out dialed number into a predetermined coded number, and sends the predetermined coded number to the radio telephone cradle. The second control means receives the predetermined coded number from the first control means in the handset and transmits the predetermined coded number.

According to a preferred aspect of the invention, for the first control means, a first computer having a stored program therein is provided in the radio telephone handset and, for the second control means, a second computer having a stored program therein is provided in the radio telephone cradle. According to another aspect of the invention, there is provided, associated with the first computer, a first memory means and a first indicating means and, associated with the second computer, a second memory means and a second indicating means.

The first or handset computer stores the dialed number in the first memory means, reads out the stored dialed number from the first memory means, converts the read out dialed number into a predetermined coded number, and sends the predetermined coded number to the cradle. The handset computer also enables the first indicating means to provide a visual indication of the dialed number.

The second or cradle computer receives the predetermined coded number from the handset computer, stores the received predetermined coded number in the second memory means, reads out the stored predetermined coded number from the second memory means, and transmits the read-out predetermined coded number. In addition, the cradle computer enables the second indicating means to provide a visual indication of the radio telephone status.

BRIEF DESCRIPTION OF THE DRAWINGS

FIGS. 3A, 3B and 3C when arranged as shown in FIG. 3D show a detailed block diagram of the radio telephone handset, the radio telephone cradle, the junction box and the radio.

FIG. 7 is a block diagram of a typical computer for controlling the cradle or handset in accordance with the invention.

DETAILED DESCRIPTION OF THE PREFERRED EMBODIMENT

Figures 1, 2:
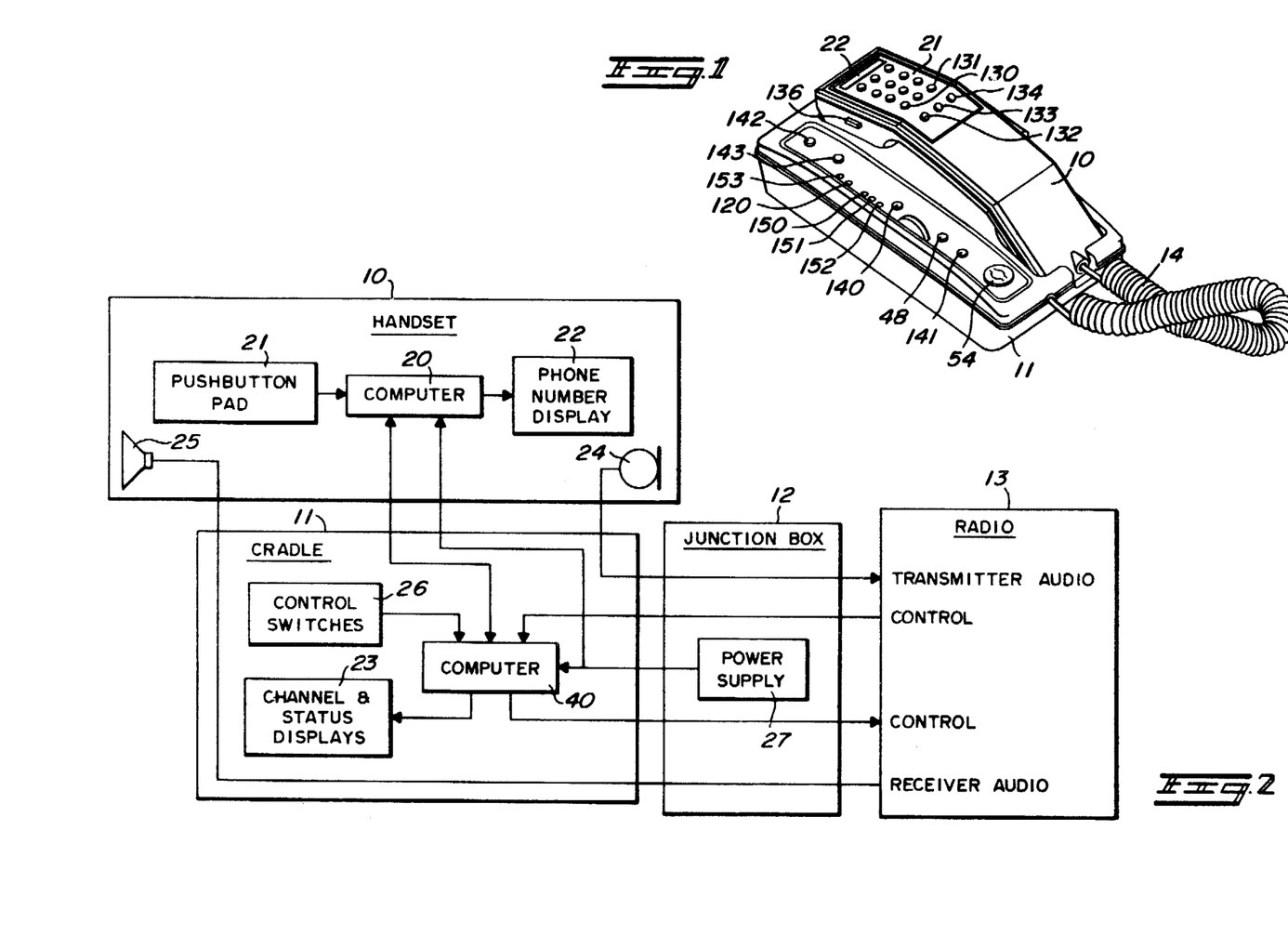
FIG. 1 is a pictorial view of the radio telephone handset and cradle.
FIG. 2 is a general block diagram showing the radio telephone handset, the radio telephone cradle, the junction box and the radio.

Referring to FIG. 1, there is shown a view of the radio telephone which exemplifies the preferred embodiment of the invention. The radio telephone consists of a handset 10 and a cradle 11 interconnected by a coil cord 14.

FIG. 2 is a general block diagram of the radio telephone showing the handset 10, the cradle 11, the junction box 12, and the radio 13 and the respective interconnections between these components. The handset 10 consists of a push button pad 21, a computer 20, a phone number display 22, a speaker 25, and a microphone 24. The cradle consists of control switches 26, a computer 40, and channel and status displays 23. The junction box 12 interconnects the cradle 11 and the radio 13 and also provides the power supply 27 for the cradle 11 and the handset 10. The radio 13 sends control information to and receives control information from the cradle computer 40, routes the microphone 24 to the radio transmitter audio, and routes the receiver audio to the speaker 25. The radio 13 contains the necessary tone generation and tone detection circuitry which, under the control of the cradle computer 20, produces the appropriate tone signalling for a particular radio telephone system. The radio telephone is optimally suited to operate with the radio described in Motorola, Inc., instruction manual entitled, "Motorola PULSAR VHF Mobile Radiotelephone", published by Motorola Engineering Publications, 1976, Chicago, Illinois.

Figures 1, 3A, 3D:
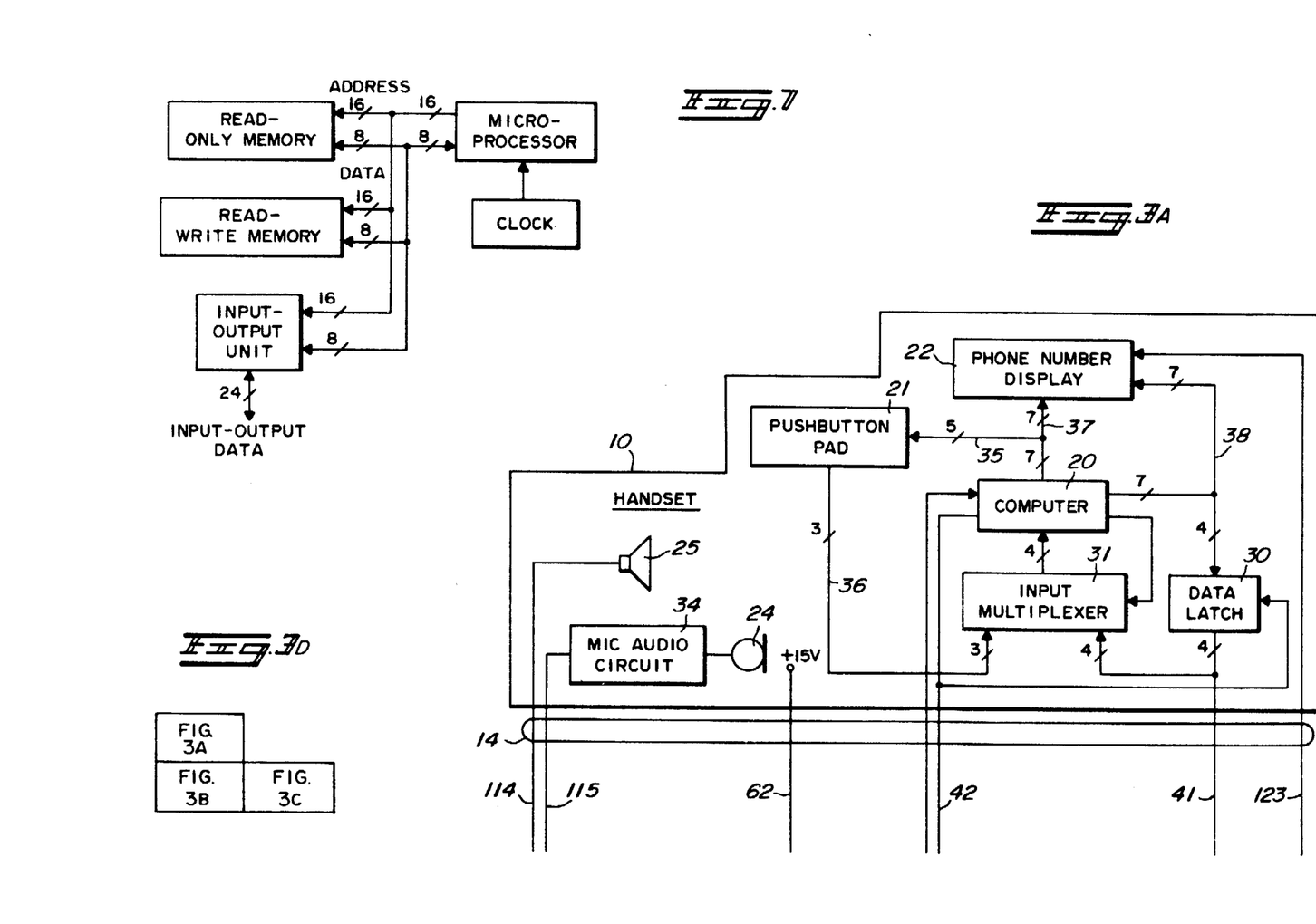
Figure 3B:
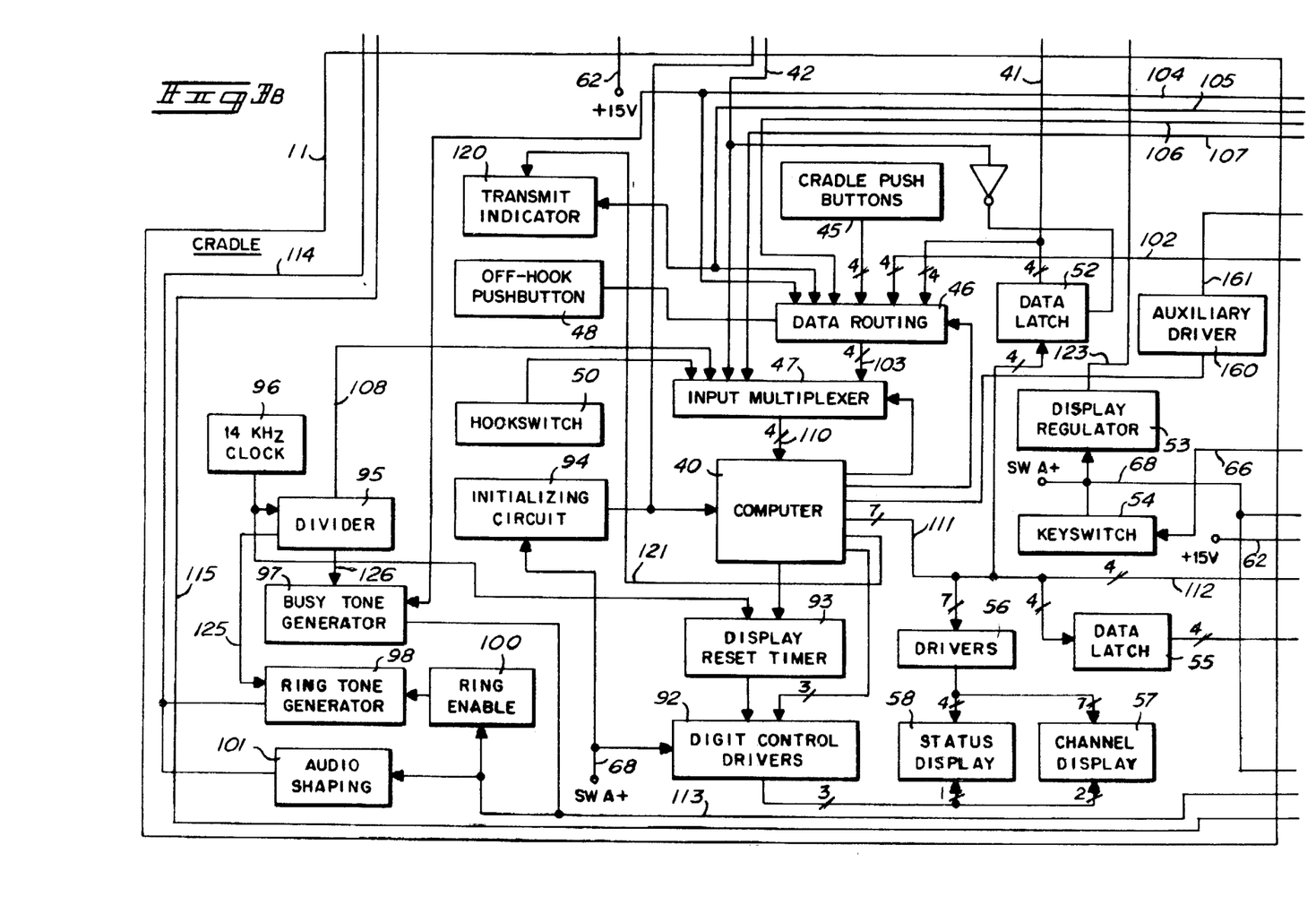
Figure 3C:
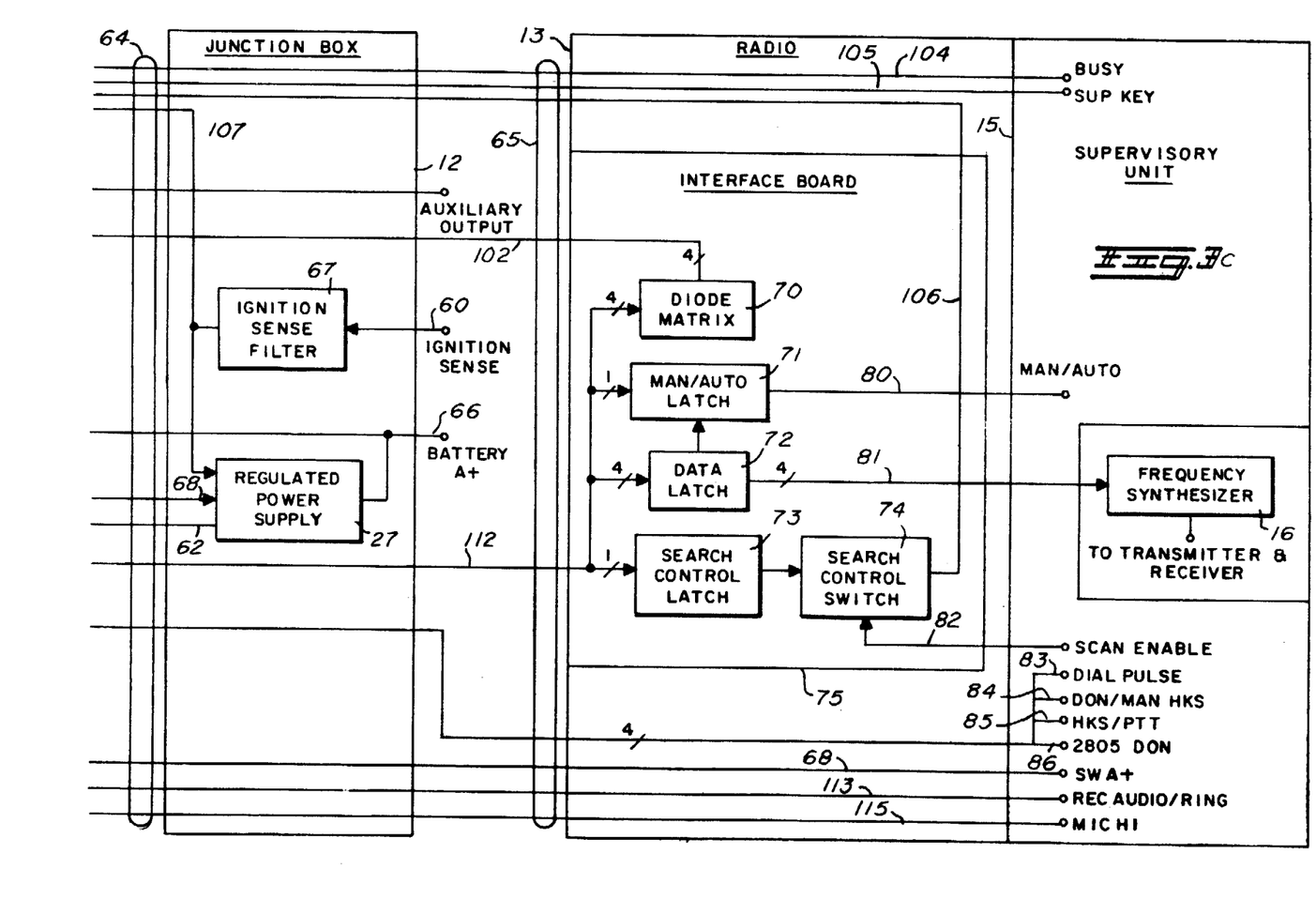

FIGS. 3A, 3B and 3C when arranged as in FIG. 3D are a detailed block diagram of the exemplary embodiment of the invention. The handset 10 is controlled by a computer 20 having a stored program control therein. For computer 20 any one of a number of computers packaged in an integrated circuit made available recently by many manufacturers, such as the Motorola MC6801, may be used. This type of computer typically is architectured as illustrated in FIG. 7.

The handset computer 20 provides five strobe lines 35 to the fifteen buttons in the pushbutton pad 21. The pushbuttons include the numerical digits (0-9), the number pushbutton 130, the channel pushbutton 131, the memory pushbutton 132, the clear pushbutton 133 and the send pushbutton 134 (see FIG. 1). The fifteen buttons in the pushbutton pad 21 are organized in a five by three matrix. A button that is depressed routes the strobe line 35 back to the computer 20 over the data lines 36 by way of the input multiplexer 31. A push-to-talk pushbutton 136 (FIG. 1) is present in the handset 10 for manually activating the radio transmitter, the activation being shown by the transmit indicator 120 in FIG. 3B. The push-to-talk pushbutton 136 is electrically in parallel with the contacts of the number pushbutton 130.

The handset computer 20 enables each of the seven digits of the phone number display 22 by the seven digit control lines 37. When each digit is enabled by its respective digit control line 37, the predetermined segment for that digit of the display is selected by the seven segment control lines 38.

The handset computer 20 communicates to the cradle computer 40 by way of the four C bus lines 41. The handset computer 20 controls the direction of the data on the C bus lines 41 by means of the C bus control line 42. The handset computer 20 monitors the state of the C bus lines 41 by way of the input multiplexer 31. The handset computer 20 loads data into the data latch 30 which is then placed on the C bus lines 41 by activation of the C bus control line 42. Data on the C bus lines 41 is normally directed from the cradle computer 40 toward the handset computer 20. The handset computer 20 alone dictates the state of the C bus control line 42.

The handset 10 contains a speaker 25 and a microphone 24 for voice audio. The voice audio from the microphone 24 is further amplified by the microphone audio circuit 34.

The cradle computer 40 is a computer having a stored program therein, which is of similar architecture to the handset computer 20. The cradle computer 40 receives input data through the data routing multiplexer 46 and the input multiplexer 47. Groups of four lines of data are multiplexed onto the data routing bus 103 by the data routing multiplexer 46. The various data lines being multiplexed are the C bus lines 41, the D bus lines 102, the cradle pushbuttons 45 (store 143, delete 142, mode 140, party/auxiliary 141), and the off-hook pushbutton 48 together with the supervisory unit lines, busy 104, supervisory key 105, and search 106. The data routing bus 103 is then multiplexed by the input multiplexer 47 onto the input multiplexer bus 110 together with the four control lines, the hook switch line 50, the C bus control line 42, the filtered ignition sense line 107, and the frame timer 108.

Data is routed from the cradle computer 40 on the seven data output lines 111. Four of the data output lines 111 are routed to the C bus data latch 52, the supervisory unit data latch 55, and to the radio 13. The four data lines to the radio 13 are designated the A bus 112. The seven output data lines 111 are also routed to the display drivers 56 to control the segment selection of the channel display 57 and the selection of the status displays 58, the home indicator 150, the roam indicator 151, the manual indicator 152 and the busy indicator 153 (see FIG. 1). The home, roam and manual indicators display the operational mode of the radio telephone, as will be explained later. The busy indicator 154 is illuminated if the available radio channels in the particular operational mode are busy. The data latch 52 places data onto the C bus lines 41 under control of the C bus control lines 42 from the handset computer 20. The supervisory unit data latch 55 contains four control lines, the dial pulse line 83, the dial-off-normal/manual hookswitch line 84, the hookswitch/push-to-talk line 85 and 2805 dial-off-normal line 86, which are routed to the supervisory unit 15 in the radio 13. The digit control drivers 92 select the units or tens digit of the channel display 57 or the status displays 58, each of which is then illuminated in accordance with the data from the display drivers 56. The display reset timer 93 sequentially enables each of the digit control drivers 92 for 1.8 ms time periods. The display reset timer 93 is driven by the 14 KHz clock 96 and reset by the cradle computer 40.

When the key switch 54 is activated, the battery A+ line 66 is connected to the switched A+ line 68 which applies voltage to the handset display regulator 53, the digit control drivers 92, the initializing circuit 94, the regulated power supply 27 in the junction box 12, and circuits in the radio 13. The handset display regulator 53 is a series-pass regulator which supplies 4.6 volts 123 to the handset phone number display 22. The initializing circuit 94 holds the handset computer 20 and the cradle computer 40 in the reset mode until the key switch 54 is activated. The initializing circuit 94 insures that both computers are in the proper start-up mode for radio telephone operation.

The receiver audio/ring line 113 from the radio supervisory unit 15 routes receiver audio to the audio shaping circuit 101, the audio being superimposed on a DC ring signal which is routed to the ring enable circuit 100. When the radio supervisory unit 15 detects the tone signalling for ringing, a DC voltage is placed on the receiver audio/ring line 113 which is then detected by the ring enable circuit 100. The ring enable circuit 100 activates the ring tone generator circuit 98 which gates an audio ring tone onto the receiver high line 114 to the handset speaker 25. In the ring generator circuit 98, the alternating two tones, for example 1200 Hz and 975 Hz tones, composing the ring signal, are created by dividing down the 7 KHz signal 125 from the divider circuit 95. When the handset 10 is removed to answer the incoming call, the ring tone generator circuit 98 is disabled and receiver audio is routed to the handset speaker 25 through the audio shaping circuit 101.

The 14 KHz clock 96 feeds the divider circuit 95 which develops the 7 KHz signal 125 for the ring tone generator circuit 98, the frame timer 108 and the 1200 Hz signal 126 for the busy tone generator circuit 97. The busy tone generator circuit 97 is activated by the busy line 104 from the radio supervisory unit 15. When enabled, the busy tone generator circuit 97 gates a busy tone onto the receive audio/ring line 113. In the busy tone generator circuit 97, the busy tone (400 Hz) is created by dividing down the 1200 Hz signal from the divider circuit 95 and interrupting it at a 1.7 Hz rate.

The transmit indicator 120 is enabled by the supervisory key line 105 or the push-to-talk output line 121 from the cradle computer 40, being illuminated whenever the radio transmitter is on.

The junction box 12 is the distribution point for interconnections with the cradle 11 via the ribbon cable 64, the radio 13 via the control cable 65, the battery A+ line 66, and the ignition sense line 60 from the vehicle ignition switch. The ignition sense line 60 is routed to the ignition sense filter 67 which removes voltage transients which occur on the ignition sense line 60. The filtered ignition sense line 107 is the output of the ignition sense filter 67 and is routed to the cradle input multiplexer 47 and the regulated power supply 27.

The regulated power supply 27 has at its input the battery A+ line and delivers the regulated voltage 62 to the control circuits in the cradle 11 and handset 10. The regulated power supply 27 contains circuitry to protect against over voltage or short circuits on the regulated voltage 62. If the filtered ignition sense line 107 or the switch A+ line 68 is activated, the regulated power supply 27 delivers +15 volts of the circuitry in the cradle 11 and handset 10. If neither of these conditions is present, the regulated power supply 27 delivers a minimum of +11.6 volts.

The radio 13 contains the cradle interface board 75, a frequency synthesizer 16, a radio frequency transmitter, a radio frequency receiver, and a supervisory unit 15. The interface board 75 contains the diode matrix 70, the manual/automatic latch 71, the channel data latch 72, and the search control latch 73. Data is transferred from the cradle computer 40 to the latches on the interface board 75 by means of the A bus lines 112. The manual/automatic line 80 from the manual/automatic latch 71 is routed to the supervisory unit 15. The channel select lines 81 from the channel data latch 72 are routed to the frequency synthesizer 16 for selecting the transmitter and receiver frequencies. The search control latch 73 enables or disables the search control switch 74 which gates the scan enable line 82 from the supervisory unit 15 to the search line 106.

The diode matrix 70 is organized into a 10×4 array of forty diodes which is capable of storing 40 bits of binary data. Diodes are selectively removed to encode a particular set of data. The presence of a diode is a binary one state, and the absence of a diode a binary zero state. The diode matrix 70 stores the home radio channel list, programl constants such as the total number of radio channels, and program functions such as fast channel scanning. The diode matrix 70 is addressed by the A bus lines 112 from the cradle computer 40. The A bus lines 112 are decoded into one of ten columns select lines which accesses four diodes. The D bus lines 102 are the row output lines from the four diodes in a selected column. When a column of four diodes is selected by the A bus lines 112, the presence or absence of each of these four diodes can be determined from the D bus lines 102.

The supervisory unit 15 in the radio 13 generates and detects the tone signalling for a particular radio telephone system. The supervisory unit is under control of the cradle computer 40. The cradle computer 40 receives the busy line 104 and the supervisory key line 105 from the supervisory unit 15 and routes to the supervisory unit 15 the dial pulse line 83, the dial-off-normal/manual hookswitch line 84, the hookswitch/push-to-talk line 85, and the 2805 dial-off-normal line 86. The supervisory unit 15 controls the receiver audio/ring line 113 which is routed to the audio circuits in the cradle 11. The microphone high line 115 from the handset microphone audio circuit 34 is routed to the supervisory unit 15 and other radio circuits.

The radio telephone embodying the present invention can operate in many different mobile telephone systems. The preferred embodiment of the radio telephone can accommodate radio telephone systems having manual or automatic radio channel selection, manual or automatic transmitter control and operator assisted or automatic direct dialing. The radio telephone has three modes of operation, home, roam, and manual. The home mode is an automatic mode of operation using a set of home radio channels for a local geographic area. The roam mode is also an automatic mode of operation, but a set of predetermined foreign radio channels are used for a geoggraphic area outside the home area. The manual mode is for manual operation in manual radio telephone systems.

Automatic operation of the radio telephone will best demonstrate the preferred aspects of the invention. Placing a call from the radio telephone is essentially the same in the home and roam modes, the difference being the set of radio channels used. First, the desired telephone number is entered from the pushbutton pad 21. Telephone numbers with seven digits or less can be entirely displayed in the phone number display 22. Next, the handset 10 is released from the cradle 11 activating the hookswitch 50. Alternately, the off-hook pushbutton 48 can be depressed to initiate the call without removing the handset 10 from the cradle 11.

The radio telephone automatically scans the available channels. If an available channel is found, the green transmit indicator 120 will come on. If all of the channels are busy, the red busy indicator 153 will come on and the busy tone generator 97 will be enabled providing an audible busy tone to the handset speaker 25.

Once dial tone is received over an available channel, the send pushbutton 134 on the pushbutton pad 21 is depressed to transmit the dialed number. The dialed number is transferred by the handset computer 20 to the cradle computer 40 and outpulsed by the cradle computer 40 as shown in FIG. 6.

Figure 6:
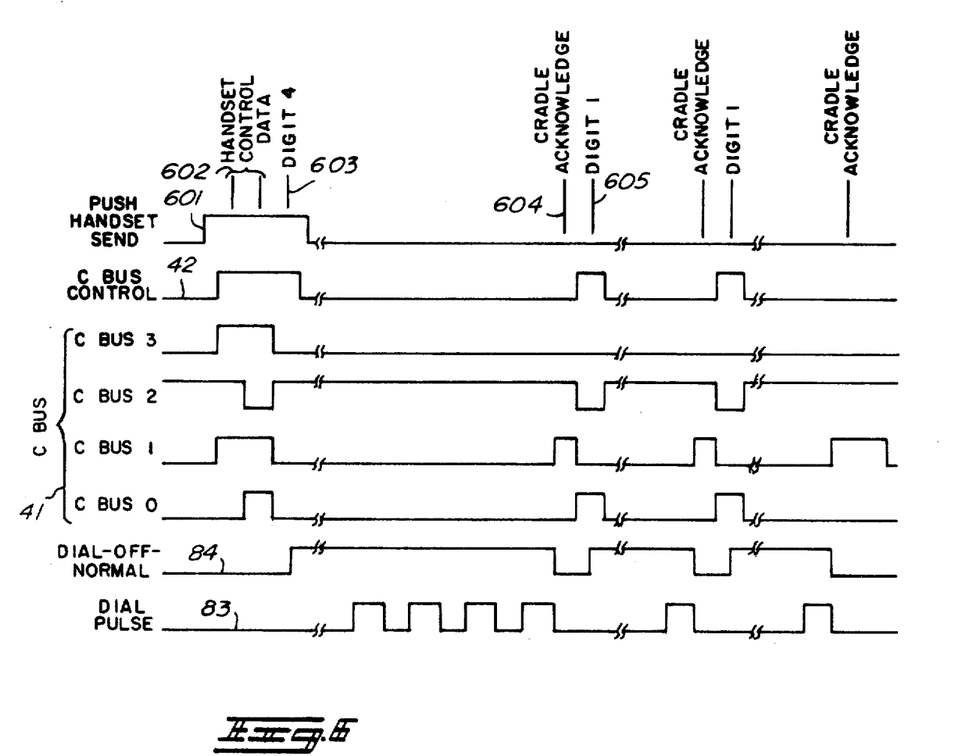
FIG. 6 is a timing diagram of the transfer of the dialed number from the handset computer to the cradle computer and the outpulsing of the dialed number from the cradle computer.

FIG. 6 illustrates the transfer and outpulsing of an entered telephone number, the number being the directory assistance number, 411. Once the handset send pushbutton 134 has been depressed 601, the C bus control line 42 changes state to direct data from the handset computer 20 to the cradle computer 40 over the C bus lines 41. The handset computer 20 places binary control data 602 on the C bus lines to indicate to the cradle computer 40 that a dialed number will be transferred. Next, the binary coding of the digit 4 (603) is placed on the C bus lines 41 by the handset computer 20. The cradle computer 40 receives the binary control data 602 and digit 4 (603) on the C bus lines 41 and activates the dial-off-normal line 84 while the digit4 (603) is outpulsed on the dial pulse line 83. After the digit 4 (603) has been outpulsed on the dial pulse line 83, the cradle computer 40 places a binary acknowledge 604 on the C bus lines 41 and deactivates the dial-off-normal line 84. When the binary acknowledge 604 is detected by the handset computer 20, the C bus control line 42 is activated and the binary digit 1 (605) is placed on the C bus lines 41 and the process is repeated. Successive digits are transferred in a similar manner until all digits have been outpulsed.

When the call is completed, conversation can take place. At the end of the call, the handset 10 is placed back into the cradle 11.

As illustrated in FIG. 6, the binary codes on the C bus lines 41 together with the C bus control line 42 are used to communicate information between the handset computer 20 and the cradle computer 40 and vice versa. The C bus lines 41 provide for up to sixteen different states. As can be ascertained from FIG. 6, the decimal digit "4" (603) is encoded as a binary four "0100", decimal digit "1" (605) a binary one "0001". Also, whenever data is placed on the C bus lines 41 by the handset computer 20, the handset computer 20 also places a logical one on the C bus control line 42 to alert the cradle computer 40 that data will follow.

Figure 8:
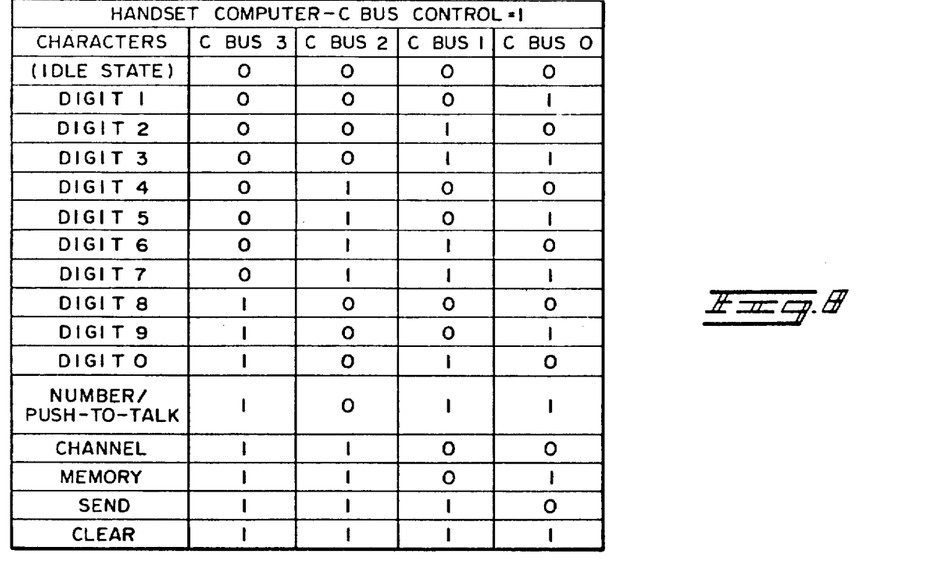
FIG. 8 is a table of the binary states placed on the C bus lines by the handset computer in response to corresponding pushbuttons.

The coding of the C bus lines 41 which correspond to each pushbutton of the handset are summarized in FIG. 8. Having sixteen available states of the C bus lines 41, any suitable assignment of states can be made for the pushbuttons. However, for the numerical pushbuttons "1 thru 0", it is convenient to assign the corresponding binary states which are equivalent to the number of dial pulses for the particular pushbutton. For example, pushbutton "0" has been assigned binary state "1010" since pushbutton "0" is representative of ten dial pulses. Once having assigned the binary states for the numerical pushbuttons, the remaining binary states of the C bus lines 41 can be assigned to the remaining pushbuttons in any suitable manner. Since the number pushbutton 130 and the push-to-talk pushbutton 136 are electrically in parallel, they have the same binary state "1011".

Figure 9:
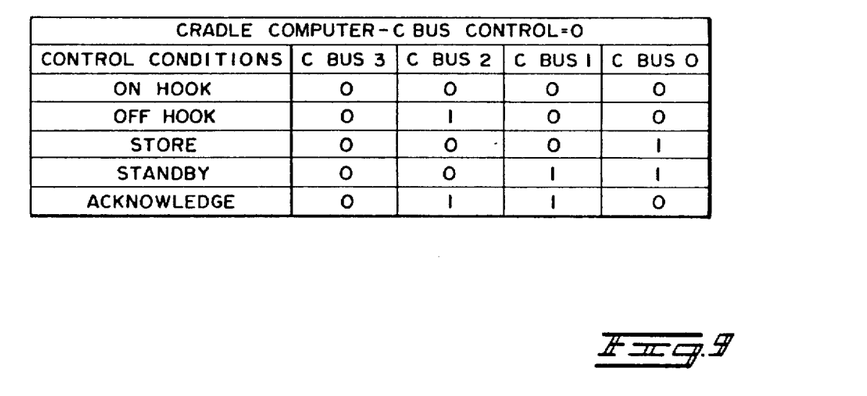
FIG. 9 is a table of the binary states placed on the C bus lines by the cradle computer in response to corresponding cradle control conditions.

A similar table in FIG. 9 illustrates the binary codes placed on the C bus control lines 41 which correspond to cradle control conditions. During the dialing operation show in FIG. 6, the C bus lines 41 have the state "0100" indicating the off-hook condition when the C bus control 42 is a logical zero. Also, the binary state "0110"0 is placed on the C bus lines 41 by the cradle computer 40 to acknowledge (604) the completion of outpulsing of each digit of a telephone number.

In response to the store pushbutton 143, the binary state "0001" is placed on the C bus lines 41 by the cradle computer 40. The binary state "0011" for the standby condition is placed on the C bus lines by the cradle computer 40 when the keyswitch 54 is on and the ignition sense 60 indicates that the automobile ignition is off. Again, there are sixteen available binary states for cradle control conditions, of which only five binary states have been assigned as indicated in FIG. 9.

The transfer and outpulsing of an entered telephone number shown by the timing diagram of FIG. 6 illustrates the binary states of FIGS. 8 and 9. FIG. 6 further shows that the handset control 602 includes both the send binary code "1110" and the number binary code "1011". However, the number binary code is essentially superfluous, only being included to activate auxiliary control functions to the supervisory unit 13, such as the DON/MAN MKS line 84, and is not essential in practicing the present invention.

An in-coming call is detected by the supervisory unit 15 which places a DC ring signal on a receiver audio/ring line 113. The DC ring signal is detected by the ring enable circuit 100 which then activates the ring tone generator circuit 98. The ring signal is gated to the handset speaker 25 and audibly alerts one of the in-coming call. The ring signal is removed when the handset 10 is removed from the cradle 11 to answer the call. The green transmit indicator 120 is illuminated when the handset 10 is picked up, and conversation can take place. When the call is completed, the handset 10 then is placed back into the cradle 11.

Many other features are made available by the flexibility of the stored program control. Ten different telephone numbers can be stored for later recall, two with up to 16 digits being stored in the memory of the handset computer 20 and eight with up to 11 digits stored in the memory of the cradle computer 40. The stored telephone numbers are recalled by depressing the memory pushbutton 132 and then the numerical digit which corresponds to the desired telephone number. The stored number is transferred to the handset 10 and loaded into the phone number display 22, and is transmitted when the send pushbutton 134 is depressed after receiving dial tone. The last number dialed can be retransmitted by depressing the send pushbutton 134 after receiving dial tone.

When on-hook, a telephone number with more than seven digits can be reviewed by repeatedly depressing the number pushbutton 130 to step the telephone number across the phone number display 22. If a telephone number has been incorrectly entered, the number can be cancelled by depressing the clear pushbutton 133. Repeatedly depressing the channel pushbutton 131 will sequentially load the channel display 57 with the radio channels from the home list if in the home mode or from the roam list if in the roam mode.

Telephone numbers preceeded by special access codes (such as 9) which route the caller to an access dial tone can be entered from the pushbutton pad 21. While on-hook, the access code is entered first. Then, the send pushbutton 134 is depressed causing a pause code to be stored and a dash to be loaded into the phone number display. Finally, the telephone number is entered. The access code, dash, and telephone number together can total up to 16 digits like any other entered telephone number. When dial tone is received during the ensuing telephone call, depressing the send pushbutton 134 causes the access code to be transmitted. When the access dial tone is received, depressing the send pushbutton 134 again causes the telephone number to be transmitted. Additional pause codes can be entered in a telephone number if desired. Telephone numbers with pause codes can also be stored.

Depressing the mode pushbutton 140 in the cradle 11 steps the radio telephone between the home, roam and manual mode of operation. The store pushbutton 143 is used to store telephone numbers and to store radio channel numbers in the roam list. The delete pushbutton 142 is used to delete radio channels from the roam list. The auxiliary alert/party pushbutton 141 will produce an auxiliary output 161 from the auxiliary driver 160 upon receipt of an incoming call if depressed when the handset 10 is on-hook and will activate the revertive call mode if depressed when the handset 10 is off-hook.

Special program functions and program constants, such as the lowest channel number, can be selectively included or deleted by the presence or absence of diodes in the diode matrix 70. The list of available home radio channels is also programmed in the diode matrix 70.

Figure 4A:
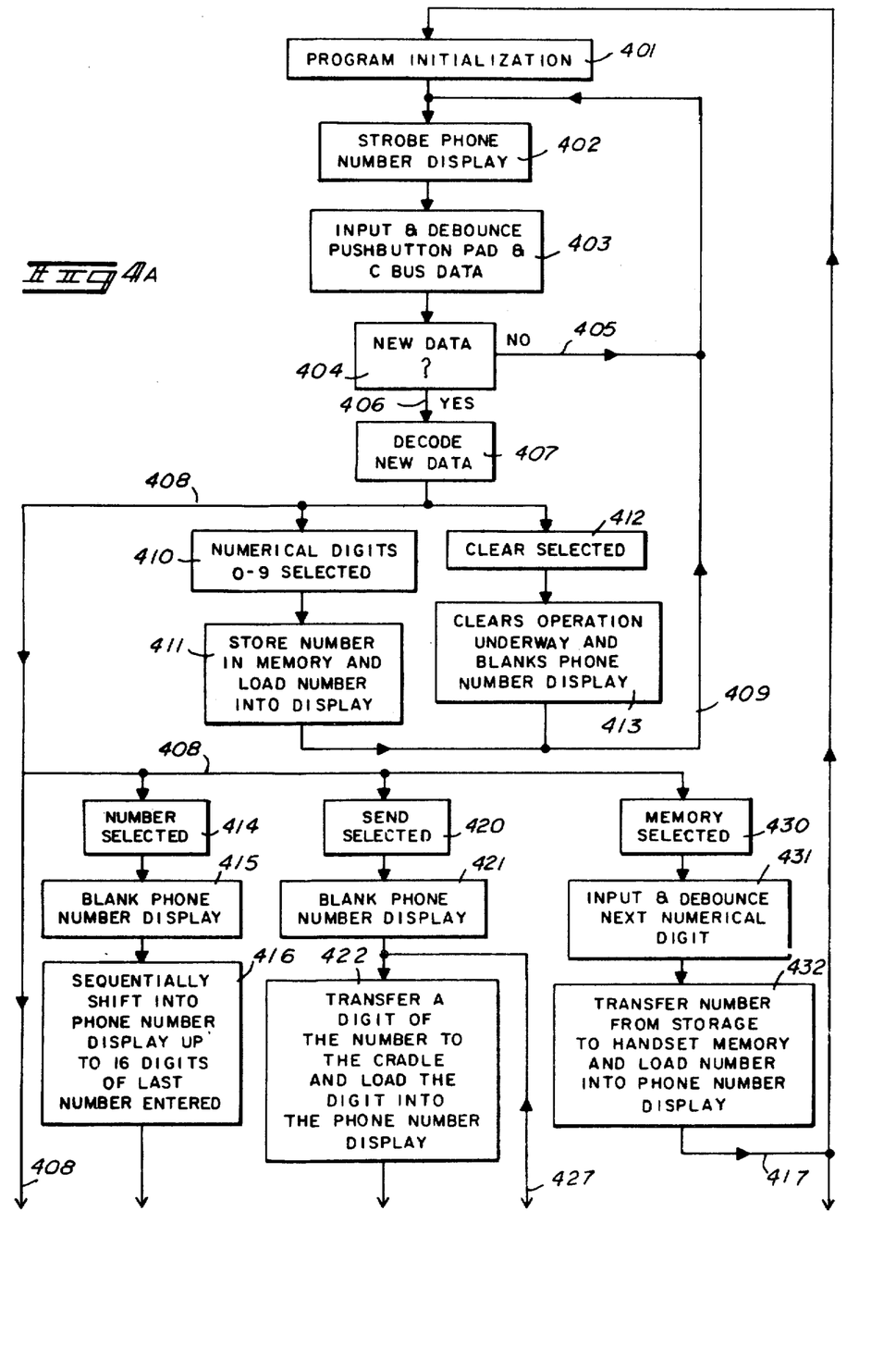
FIGS. 4A and 4B in combination show a flow chart of the stored program control for the radio telephone handset computer.
Figure 4B:
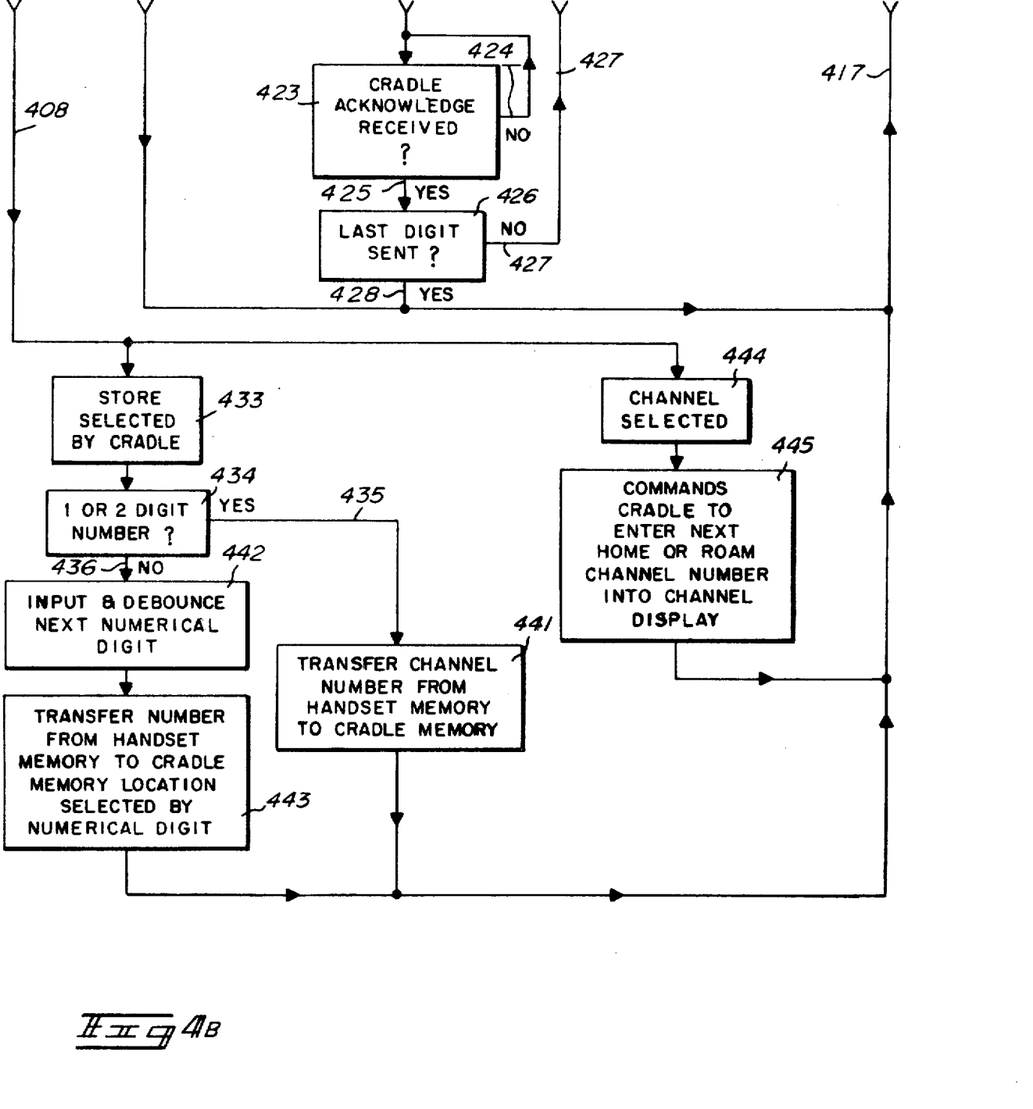

The stored program control for the handset computer 20 can be generally understood by referring to the flow chart of FIGS. 4A and 4B. Three basic functions are performed by the handset stored program control; (1) scan the pushbutton pad 21 for depressed pushbuttons, (2) generate data for the digit control lines 37 and segment control lines 38 to properly illuminate the phone number display 22 and (3) communicate with the cradle computer 40 over the C bus lines 41.

Referring to the flow chart of FIG. 4A and 4B, the handset stored program control begins at the step of program initialization, this step being represented by box 401. During initialization the program pointers and control status locations are up-dated in preparation for subsequent program operations. The program then proceeds to box 402 where the phone number display 22 is refreshed. Next, the state of the pushbuttons in the pushbutton pad 21 and the state of the C bus lines 41 are inputted and stored as shown in box 403. The data received is then compared to the previous data in order to debounce changes in the data. New data is accepted if the last two samples are in agreement. If new data has not been found, the test represented by decision box 404, the NO branch 405 is followed back to box 402 to continue to look for new data. Otherwise, the YES branch 406 is followed and the new data is decoded as indicated by box 407. The program now branches along path 408 to the next box depending on which operation is commanded by the decoded data.

The program proceeds along path 408 to box 412 if the clear pushbutton 133 has been decoded. Proceeding to box 413, the clear operation cancels the telephone number that was entered, blanks the phone number display 22 and terminates any operation that is underway. Next, the program returns along path 409 to box 402 to resume searching for new data.

If a digit (0-9) of a telephone number entered from the pushbutton pad 21 has been decoded, the program proceeds along path 408 to box 410. The digit of the telephone number is stored in the last-number-called memory location and loaded into the phone number display 22 as shown in box 411. The program then returns along path 409 to box 402 to resume searching for new data.

If the number pushbutton 130 has been decoded, the program proceeds along path 408 to box 414. The phone number display 22 is then blanked as shown in box 415. Next, the previously entered telephone number, consisting of up to 16 digits, is shifted into the phone number display 22 a digit at a time as the number pushbutton 130 is repeatedly depressed, this step being represented by box 416. The program then returns along path 417 to box 401.

If the send pushbutton has been decoded, the program proceeds along path 408 to box 420. First, the phone number display 22 is blanked as shown in box 421. Next, the previously entered telephone number is transferred by the handset computer 20 to the cradle computer 40 over the C bus lines 41. As the telephone number is transferred, each digit is sequentially loaded into the phone number display 22, these steps being represented by box 422. The handset computer 20 transfers a digit and then waits for the cradle acknowledge. If the cradle acknowledge is not received, the test being represented by decision box 423, the NO branch 424 is taken and the wait is continued. Otherwise, the YES branch 425 is taken and a test is made to determine whether the last digit of the telephone number has been sent, as indicated by decision box 426. If the last digit has not been sent, the NO branch 427 is taken to box 422 and another digit is transferred. Otherwise, the YES branch 428 is taken to return along path 417 to box 401.

If the memory pushbutton 132 has been decoded, the program proceeds along path 408 to box 430. Next, a numerical digit which is entered from the pushbutton pad 21 is used to select the stored telephone number, this step being represented by box 431. Proceeding to box 432, the selected telephone number is retrieved from its respective memory location and loaded into the last-number-called memory location and into the phone number display 22. The telephone number accessed is now ready to be transmitted during an ensuing call. The program then returns along path 417 to box 401.

If the store command from the cradle 11 has been decoded, the program proceeds along path 408 to box 433. If the entered number has one or two digits, the test represented by decision box 434, the YES branch 435 is taken, and the entered number is treated as a channel number. Next, the channel number entered is transferred by the handset computer 20 to the cradle computer 40 and stored in the cradle memory, this step being represented by box 441. When all of the radio channels have been loaded into the roam list, the channel pushbutton 131 can be depressed to review the list of radio channels. The program then returns along path 417 to box 401. If the entered number has more than two digits, the NO path 436 is taken. The next numerical digit that is entered from the pushbutton pad 21 determines the memory location into which the previously entered telephone number is to be stored, as represented by box 442. The telephone number is transferred by the handset computer 20 to the designated memory location when the store pushbutton 143 is depressed, as indicated by box 443. The program then returns along path 417 to box 401.

If the channel pushbutton 131 is decoded, the program proceeds along path 408 to box 444. Next, the channel command from the handset computer 20 is sent to the cradle computer 40 causing the next available radio channel number to be loaded into the channel display 57, as represented by box 445. The program then returns along path 417 to box 401.

Figure 5A:
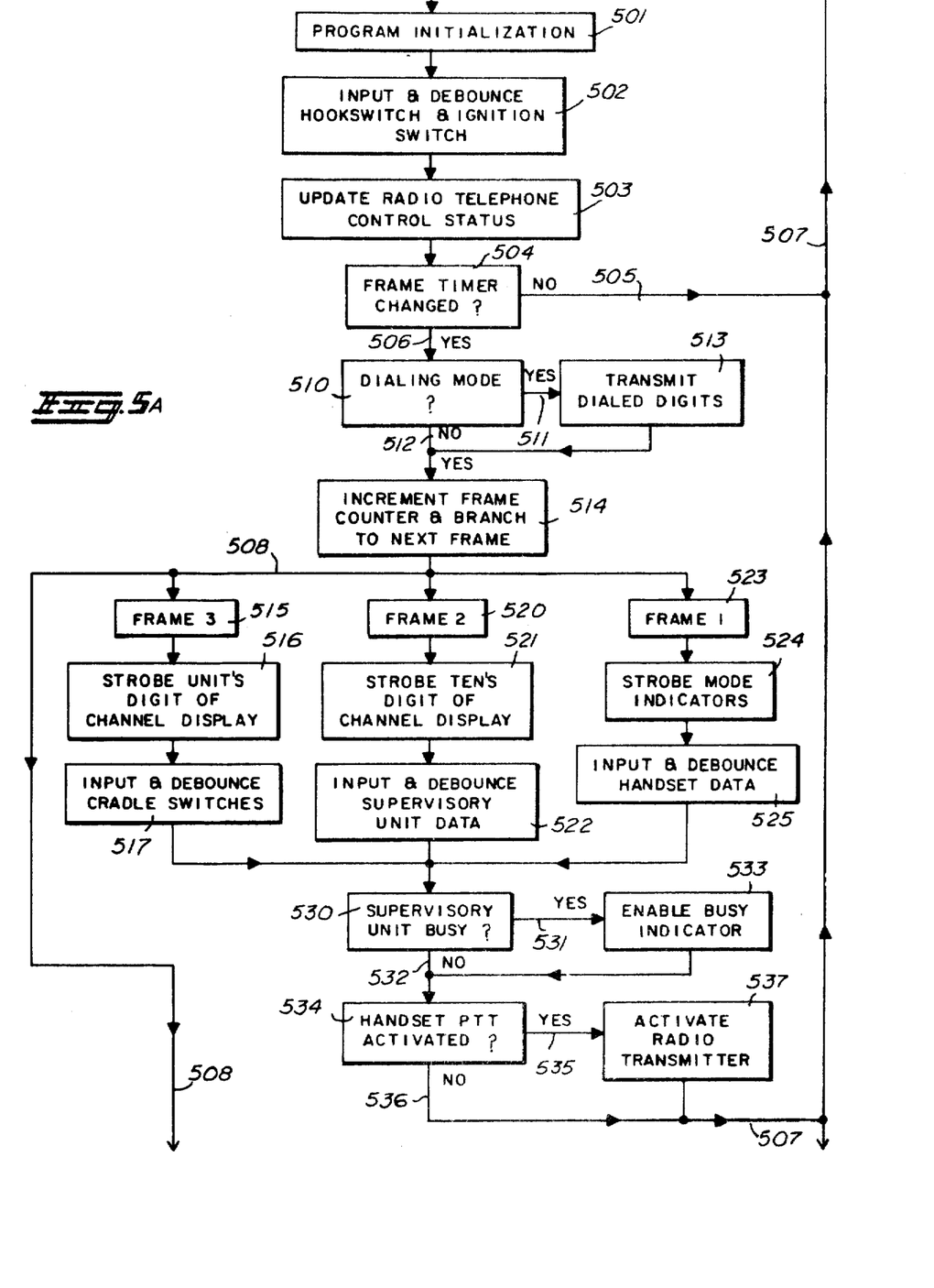
FIGS. 5A and 5B in combination show a flow chart of the stored program control for the radio telephone cradle computer.
Figure 5B:
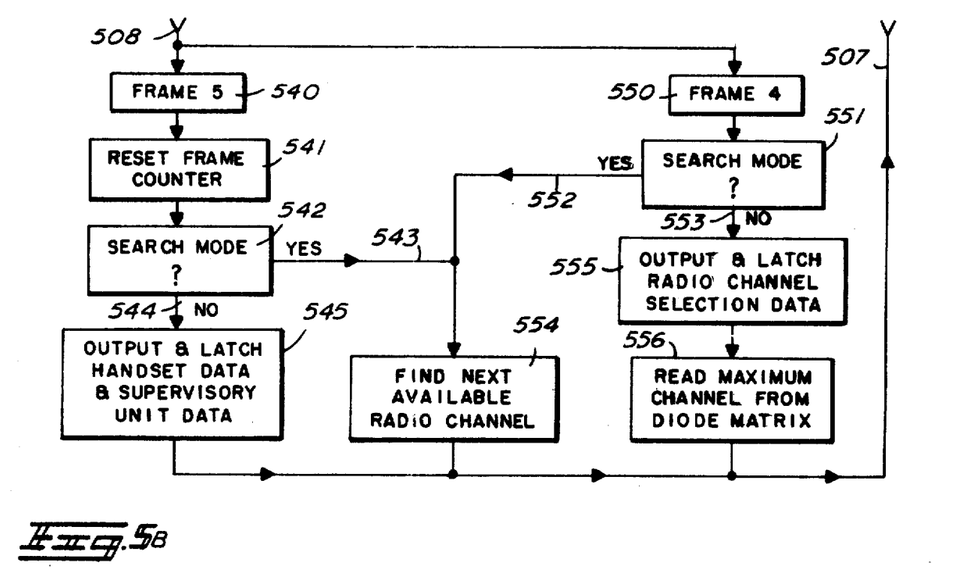

The stored program control for the cradle computer 40 can be generally understood by referring to the flow chart of FIGS. 5A and 5B. The cradle stored program control performs the following basic functions: (1) scan the cradle pushbuttons 45, off-hook pushbutton 48 and hookswitch 50; (2) illuminate the channel display 57, the status displays 58 and the transmit indicator 120; (3) communicate with the radio supervisory unit 15; (4) control the radio channel frequency; (5) access information from the diode matrix 70; and (6) communicate with the handset computer 20 over the C bus data lines 41. The cradle program is divided into five frames during which specific data is transmitted, received and reviewed, each frame being completed in slightly less than 2.3 milliseconds. During the remaining time of each frame, the program up-dates control status, monitors critical inputs, and transmits dialing.

Referring to FIGS. 5A and 5B, the program begins at the step of program initialization where the program pointers and program control status locations are updated in preparation for subsequent program operations, as represented by box 501. Next, the off-hook pushbutton 48, the hookswitch 50 and the filtered ignition sense 107 are sampled to determine if any change has occurred, as represented by box 502. The sampled state of the signal is compared to the previous state of the signal in order to debounce the signals. A change in state is accepted if the present and previous states reflect the changed state. Then, radio telephone control status is up-dated in accordance with the new data, as indicated by box 503.

Next, at decision box 504 the 2.3 millisecond frame timer 108 is tested for a change of state. If the frame timer 108 has not changed state, the NO branch 505 is taken to return along path 507 to box 501. Otherwise, the YES branch 506 is taken to the decision box 510. If the radio telephone is in the dialing mode, the YES branch 511 is taken to box 513. The digits of the dialed number are transmitted to the radio supervisory unit 15 over the dial pulse line 83. The make-break ratio of the dialed digits on the dial pulse line 83 is accurately controlled by the cradle computer 40. Otherwise, the NO branch 512 is taken to box 514. Next, the frame counter is incremented and the program advances to the next sequential frame along path 508.

If the frame counter is in state 1, the program advances along path 508 to frame 1 as shown in box 523. Next, the digit control driver 92 for the cradle status displays 58 is enabled to illuminate the status displays 58 in accordance with the data from the display drivers 56, this step being represented by box 524. Proceeding to box 525, data from the handset computer 20 is sampled on the C bus lines 41. The handset data is debounced and stored for subsequent updating of the radio telephone control status. Next, the supervisory unit busy line 104 is tested in the decision box 530. If the busy line 104 is activated, the YES branch 531 is taken to box 533 where the busy indicator 153 is illuminated. Otherwise the NO branch 532 is taken to the decision box 534. If the handset push-to-talk pushbutton 136 has been activated, the YES branch 535 is taken to box 537 where the radio transmitter indicator 120 is illuminated. Otherwise, branch 536 is taken to return along path 507 to box 501.

If the frame counter is in state 2, the path 508 is taken to frame 2 as shown in box 520. Next, the digit control driver 92 for the tens digit of the channel display 57 is enabled to illuminate the tens digit in accordance with the data from the display drivers 56, this step being represented by box 521. Proceeding the box 522, supervisory unit data lines are sampled by the cradle computer 40. The supervisory unit data is debounced and stored by the cradle computer 40 for subsequent up-dating of the radio telephone control status. The program then proceeds to decision box 530 as described previously for frame 1.

If the frame counter is in state 3, path 508 is taken to frame 3 as shown in box 515. Proceeding to box 516, the digit control driver 92 for the units digit of the channel display 57 is enabled to illuminate the units digit in accordance with the data from the display drivers 56. Next, the cradle pushbuttons 45 are sampled by the cradle computer 40 as indicated by box 517. The data representing the states of the cradle pushbuttons 45 is debounced and stored by the cradle computer 40 for subsequent up-dating of the radio telephone control status. The program then proceeds to decision box 530 as described previously for frame 1.

If the frame counter is in state 4, path 508 is taken to frame 4 as shown in box 550. Proceeding to decision box 551, if the radio telephone is in the search mode, the YES branch 552 is taken to box 554 where the next available radio channel is accessed. Otherwise, the NO branch 553 is taken to box 555. The cradle computer 40 then transfers the current radio channel number to the data latch 72 via the A bus lines 112. The channel select data lines 81 from the data latch 72 are routed to the frequency synthesizer 16 to determine the radio channel frequency. Next, the maximum radio channel number is addressed in the diode matrix 70 by the A bus lines 112 and read into the cradle computer 40 via the D bus lines 102, as represented by box 556. The program then returns along path 507 to box 501.

If the frame counter is in state 5, path 508 is taken to frame 5 as shown in box 540. Next, the frame counter is reset to frame zero as shown in box 541. Proceeding to the decision box 542, if the radio telephone is in the search mode, the YES branch 543 is taken to box 554 where the next available radio channel is accessed. Otherwise, the NO branch 544 is taken to box 545. The cradle computer 40 loads the data latch 52 with current data to be transferred to the handset computer 20 on the C bus lines 41 and loads data latch 55 with the current states of the supervisory unit control signals. The program then returns along path 507 to box 501.

The foregoing embodiments have been intended as illustrations of the principles of the present invention. Accordingly, other embodiments can be devised by those skilled in the art without departing from the spirit and scope of the principles of the present invention. For example, the first control means and second control means can be consolidated into a single control means. Such a consolidated control means and a memory means can be located in either the handset 10, the cradle 11, or the radio 13. Likewise the first memory means associated with the first control means can be located in the cradle associated with the second control means. The illustrative embodiment of the invention shows a computer 20 in the handset 10 and a computer 40 in the cradle 11. The memory means for storing the dialed numbers can be included in either the handset computer 20 or the cradle computer 40. The functions of these two computers can be consolidated into one computer which is situated in either the handset 10, the cradle 11, or the radio 13.

I claim:

1. A control circuitry for a radio telephone transceiver including a transmitter, a receiver, a supervisory unit for providing supervisory signalling between the radio telephone transceiver and a base station, a cradle, and a handset having a pushbutton dial for entering the digits of a telephone number, said control circuitry comprising:

first computer means having a first memory for storing a first control program, and a second memory, said first computer means being disposed in the handset, said first computer means receiving the entered telephone number, converting the received telephone number to a related coded telephone number and storing the related coded telephone number in the second memory;

second computer means disposed in the transceiver and having a memory for storing a second control program;

data bus means having at least one data line for coupling said first computer means to said second computer means;

send pushbutton means located on the handset, said first computer means responsive to an activation of said send pushbutton means for reading out from the second memory the stored related coded telephone number, and coupling in succession the digits of the read-out related coded telephone number to said data bus means, said second computer means receiving the digits of the related coded telephone number from said data bus means and outpulsing the received digits of the related coded telephone number to the supervisory unit.

2. The control circuitry according to claim 1, wherein said first computer means is responsive to subsequent activations of the send pushbutton means.

3. The control circuitry according to claim 1, wherein the handset includes indicating means, said computer means enabling the first indicating means to provide visual indication of the digits of the entered telephone number.

4. The control circuitry according to claim 1, wherein said cradle includes indicating means, said second computer means enabling said indicating means to provide visual indication of a predetermined status of said radio telephone transceiver.

5. The control circuitry according to claim 1, wherein said cradle includes an off-hook switch for enabling said transmitter without removing said handset from said cradle.

6. The control circuitry according to claim 5, wherein the pushbutton dial is spatially disposed on the handset to enable the entering of a telephone number without removing the handset from the cradle.

7. The control circuitry according to claim 1, wherein the second control program of said second computer means includes means for providing home operation of said radio telephone.

8. The control circuitry according to claim 7, wherein the second control program includes means for selecting a non-busy home radio channel from a plurality of predetermined home radio channels.

9. The control circuitry according to claim 1, wherein the second control program of said second computer means includes means for providing roam operation of said radio telephone.

10. The control circuitry according to claim 9, wherein the second control program includes means for selecting a non-busy roam radio channel from a plurality of predetermined roam radio channels.

11. The control circuitry according to claim 1, wherein the second control program of said second computer means includes means for providing manual operation of said radio telephone.

12. The control circuitry according to claim 1, wherein the first computer means stores a predetermined pause code in the second memory between a first related coded telephone number having at least one digit and a second related coded telephone number in response to an activation of the send pushbutton means after the first telephone number has been entered, when said control circuitry is in the on-hook state.

13. The control circuitry according to claim 12, wherein the first computer means sends the first related coded telephone number to the second computer means in response to a first activation of the send pushbutton means and sends the second related coded telephone number to the second computer means in response to a second activation of said send pushbutton means, when said control circuitry is in the off-hook state.

14. The control circuitry according to claim 1, wherein the second computer means is disposed in the cradle.

15. The control circuitry according to claim 1, wherein the first and second computer means are disposed in the transceiver.

16. The control circuitry according to claim 1, further including housing means, said second computer means being disposed in the housing means.

17. The control circuitry according to claim 1, wherein said handset includes a plurality of first-control switches that are coupled to the first computer means.

18. The control circuitry according to claim 17, wherein said plurality of first control switches includes a clear switch, said first computer means clearing the stored related coded telephone number from the second memory in response to an activation of the clear switch.

19. The control circuitry according to claim 17, wherein said handset further includes a first indicating means, said first computer means enabling the first indicating means to provide visual indication of the digits of the entered telephone number.

20. The control circuitry according to claim 19, wherein said plurality of first control switches includes a number switch, said first computer means first blanking the first indicating means and subsequently shifting the digits of the entered telephone number into the first indicating means one digit at a time in response to the first and subsequent activations, respectively, of the number switch.

21. The control circuitry according to claim 17, wherein said second computer means includes a second memory and said cradle includes a plurality of second control switches that are coupled to the second computer means.

22. The control circuitry according to claim 21, wherein said plurality of second control switches includes a hookswitch, said second computer means selecting a non-busy channel from a plurality of predetermined radio channels stored in its second memory in response to activation of the hookswitch when the handset is removed from the cradle.

23. The control circuitry according to claim 22, wherein the cradle further includes an indicating means, said second computer means enabling the indicating means to provide visual indication of the selected radio channel.

24. The control circuitry according to claim 23, wherein said plurality of first control switches includes a channel switch, in response to each activation of the channel switch, said second computer means enabling the indicating means to provide visual indication of successive ones of the predetermined radio channels.

25. The control circuitry according to claim 21, wherein said plurality of second control switches includes a store switch, in response to an activation of the store switch said first computer means reading out from its second memory the stored related coded telephone number, and coupling in succession the digits of the read-out related coded telephone number to said data bus means; and said second computer means successively receiving the digits of the related coded telephone number from said data bus means and storing the received digits of the related coded telephone number in the its second memory.

26. The control circuitry according to claim 25, wherein said plurality of first control switches includes a memory switch, in response to an activation of the memory switch said second computer means reading out from its second memory the stored related coded telephone number, and coupling in succession the digits of the read-out related coded telephone number to said data bus means; and said first computer means successively receiving the digits of the related coded telephone number from said data bus means and storing the received digits of the related coded telephone number in its second memory.

27. The control circuitry according to claim 25, wherein channel numbers are entered as telephone numbers having at most two digits, said second computer means converting received related coded telephone numbers having at most two digits to related coded channel numbers and storing the related coded channel numbers in its second memory.

28. The control circuitry according to claim 27, wherein said plurality of second control switches includes a delete switch, said second computer means deleting all stored related coded channel numbers from its second memory in response to an activation of the delete switch.

29. The control circuitry according to claim 21, wherein said plurality of second control switches includes a mode switch, said computer means stepping between home, roam and manual operational modes in response to each activation of the mode switch.

30. The control circuitry according to claim 21, wherein said plurality of second control switches includes a key switch, said first computer means and said second computer means being held reset in a standby mode until said key switch is activated.

* * * * *

UNITED STATES PATENT AND TRADEMARK OFFICE
CERTIFICATE OF CORRECTION

PATENT NO. : 4,220,820
DATED : September 2, 1980
INVENTOR(S) : Thomas Owen Mallien II It is certified that error appears in the above-identified patent and that said Letters Patent are hereby corrected as shown below:

Col. 5, line 14, change "975 Hz" to -- 875 Hz --.
Col. 5, line 53, change "+15 volts of" to -- +15 volts to --.
Col. 6, line 11, change "program1" to -- program --.
Col. 6, line 48, change "geoggraphic" to -- geographic --.
Col. 7, line 20, change "digit4" to -- digit 4 --.
Col. 7, line 68, change "0110"0 to --0110 --.
Col. 13, line 39, before "computer" insert -- first --.
Col. 15, line 20, delete the word "the".
Col. 16, line 20, add the word -- second -- after "said".

Signed and Sealed this

Twenty-fifth Day of November 1980

[SEAL]

Attest:

SIDNEY A. DIAMOND

Attesting Officer,

Commissioner of Patents and Trademarks